United States Patent Office 2,892,834
Patented June 30, 1959

2,892,834
CYANINE DYES

George De Stevens, Portland, and Robert H. Sprague, East Hampton, Conn., assignors to Sperry Rand Corporation, a corporation of Delaware No Drawing. Application May 10, 1955
Serial No. 507,458

14 Claims. (Cl. 260—240.4)

This invention relates to sensitizing dyes for use in photographic processes, and to processes and materials employed in producing them, and more particularly to the formation of a thiazole base of a new class by reacting dibromodioxane (Yanovskaya et al., fhur Obskchei Khim 22, 1594 (1952) C. A. 47, 8032 (1953) or other brominating agents i.e., N-bromosuccinimide, dibromatin, etc., with thioacetamide. The reaction proceeds as follows:

(1)

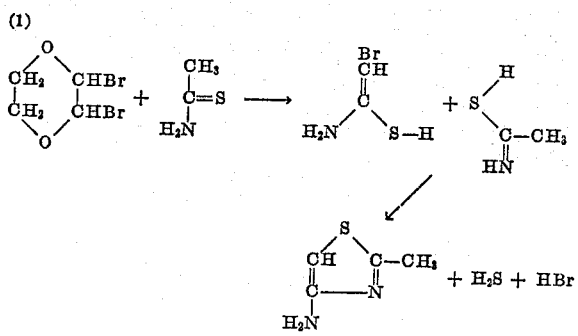

This heterocyclic compound has been designated as 4-amino 2-methyl thiazole (I).

Cyanine dyes contain at least two auxochromic nitrogen atoms, the one ternary and the other quaternary, the one nitrogen atom lying in one heterocyclic nucleus and the other lying in another heterocyclic nucleus, the two nitrogen atoms being connected by a conjugated carbon chain.

We have now found that it is possible to prepare cyanine dyes in which one or both of the above mentioned auxochromic nitrogen atoms lie in a 4-amino-thiazole nucleus. We have further found that these new cyanine dyes sensitize photographic emulsions strongly and cleanly, i.e., without producing excessive fog or residual dye stain.

It is accordingly an object of our invention to provide new cyanine dyes. A further object is to provide photographic emulsions sensitized with such dyes. Other objects will appear hereinafter.

As starting material for the preparation of our new dyes we employ our new base 4-amino-2-methylthiazole.

We first convert 4-amino-2-methyl thiazole to quaternary salts by reacting the base with esters, such as alkyl halides, alkyl sulfates, or alkyl-p-toluene sulfonates, for example. For purposes of convenience the quaternary salts useful in practicing this invention can be represented by the following single formula:

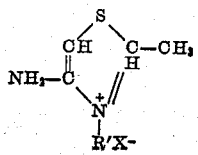

wherein R' represents an alkyl group, e.g. methyl, ethyl, n-propyl, isobutyl, n-butyl, β-hydroxyethyl, β-methoxyethyl, β-ethoxyethyl, β-acetoxyethyl, β-carboxyethyl, carboxymethyl, β-carbomethoxyethyl, β-carbethoxyethyl, allyl, etc. or an aralkyl group, e.g. benzyl, phenyl, ethyl, etc. and $X^-$ represents an anion, e.g. chloride, bromide, iodide, benzene sulfonate, p-toluene sulfonate, methyl sulfate, ethyl sulfate, thiocyanate perchlorate, acetate, etc.

To prepare pseudocyanine dyes from such quaternary salts react the quaternary salts with α-halogenoquinoline quaternary salts, in the presence of an acid binding agent, such for example, as sodium ethylate, sodium carbonate, pyridine or a strong organic base (e.g. triethyl amine, tri-methylamine and N-methyl piperidine). We have found it advantageous to employ a mixture of pyridine with a strong tertiary organic base.

Instead of 2-halogenoquinoline quaternary salts, we can employ 2-alkyl mercapto or 2-aryl mercaptoquinoline quaternary salts to condense with the quaternary salts of 4-amino-2-methyl thiazole in the presence of an acid binding agent.

Using 2-halogenopyridine quaternary salts instead of 2-halogenoquinoline quaternary salts, we can prepare pyrido-cyanine dyes containing a 4-amino-thiazole nucleus.

Using 2-alkyl mercapto or 2-aryl mercaptcbenzothiazole or naphthothiazole salts, we can prepare simple cyanine dyes other than pseudocyanine dyes.

To prepare symmetrical carbocyanine dyes from 4-amino-2-methyl thiazole quaternary salts, we react the quaternary salts with esters of ortho acids, e.g. ethyl orthoformate, ethyl orthoacetate, ethyl orthopropionate and ethyl orthobenzoate in the presence of pyridine or a mixture of pyridine and triethyl amine.

To prepare unsymmetrical carbocyanine dyes from 4-amino-2-methyl thiazole quaternary salts, we react the quaternary salts with cycloammonium quaternary salts containing a β-aryl aminovinyl group in the alpha or gamma position, i.e. in one of the so-called reactive positions in the presence of an acid binding agent, e.g. pyridine or pyridine plus triethyl amine.

To prepare styryl dyes from our new quaternary salts, we condense them with p-dialkyl aminobenzaldehyde in the presence of an alkaline catalyst, e.g. piperidine in absolute ethanol solution.

To prepare merocarbocyanine dyes from 4-amino-2-methyl thiazole quaternary salts, we condense the quaternary salts with ketomethylene heterocyclic intermediates containing an aryl amino-methylene group in the 5-position in the presence of an acid binding agent, e.g. pyridine plus triethyl amine. Examples of such ketomethylene intermediates are 5-acetanilido methylene-3-ethyl rhodanine, 5-acetanilidomethylene-3-ethyl-1-phenyl-2-thiohydantoin, etc.

To sensitize photographic silver halide emulsions with our new dyes, we disperse the dyes in the emulsions. Our invention is particularly directed to the customarily employed gelatino-silver-halide emulsions, such as the gelatino-silver-bromide, bromiodide, chloride and chlorobromide for example. The method of incorporating dyes in emulsions are simple and well known to those skilled in the art and described in various patents and publications, for example, U.S. Patent 2,336,843, patented December 14, 1943.

It is well known that cyanine dyes resonate between two extreme forms and that a cyanine dye can be represented by either of the two extreme forms. Thus, the unsymmetrical type of instant dyes can be represented by either of the following formulas:

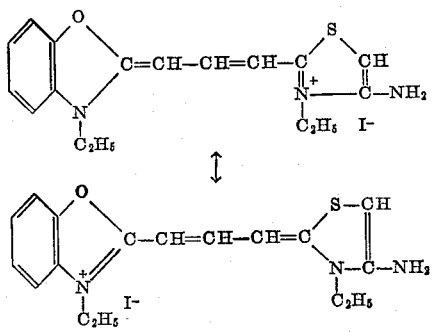

The following examples will serve to demonstrate the manner of preparation of our new base, quaternary salts and dyes. These examples are not, however, intended to limit our invention.

*Example 1.—4-amino-2-methyl thiazole*

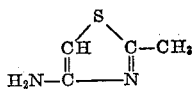

In a flask containing 400 g. (1 mol) of dibromodioxane chilled to 0°, there was added 133.2 g. (1 mol) of thioacetamide. A vigorous reaction immediately commenced, the reaction temperature rising to 60°. After the initial reaction subsided, the mixture was heated for 2 hours on the steam bath. On cooling, 150 ml. of water was added to the mixture. Some solid residue remained undissolved. The mixture was filtered and the filtrate was made alkaline to pH 10 with 10% sodium hydroxide. This was extracted with ether and the ether extract was dried over $K_2CO_3$. After removal of the ether by distillation, the residue was fractionally distilled at reduced pressure, the 4-amino-2-methyl thiazole distilling over at 50°/12 mm. Yield: 21 g. 9% of theoretical.

*Example 2.—4-amino-2-methyl thiazole methiodide*

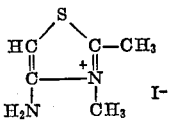

17 g. (1 mol) of 4-amino-2-methyl thiazole was heated on a steam bath for 4 hours with 18 g. (1 mol plus 10% excess) of methyl iodide. On cooling, the semi-solid cake was triturated first with ether and then with acetone. The white powder was collected on a filter, washed with acetone and dried in a dessicator. Yield: 6 g. 18% of theoretical. M.P. 235° d.

*Example 3.—4-amino-2-methyl-thiazole ethiodide*

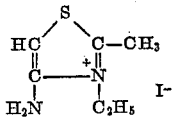

8 g. (1 mol) of 4-amino-2-methyl thiazole and 8 g. (1 mol plus 10% excess) of ethyl iodide were heated on the steam bath for 2 days. On cooling, a dark viscous material was obtained which was washed several times with ether. The residue was then washed with acetone, collected on a filter, washed again with acetone and dried in a dessicator. Yield: 3.0 g. 20% of theoretical. M.P. 205° d.

*Example 4.—3,3'-dimethyl-4,4'-diaminothiazolo-carbocyanine iodide*

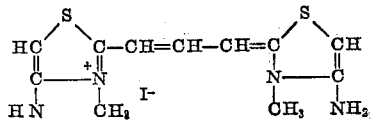

3 g. (1 mol) of 4-amino-2-methyl thiazole methiodide, 3 g. (1 mol plus 100% excess) of triethyl orthoformate and 30 ml. of pyridine was refluxed for two hours. After chilling overnight, the precipitate was collected on a filter, washed well with water then acetone and air dried. In this manner, 0.9 g. (20%) of crude dye was obtained. The dye, after two recrystallizations from methyl alcohol (400 ml. per gram) was obtained in 11% yield as fine green needles melting at 221° with decomposition. A solution of the dye in methyl alcohol is reddish orange with an absorption maximum at 516 mu.

*Example 5.—3,3'-diethyl-4,4'-diaminothiazolo-carbocyanine iodide*

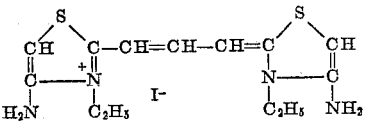

1.6 g. (1 mol) of 4-amino-2-methyl thiazole ethiodide, 1.6 g. (1 mol plus 100% excess) of ethyl orthoformate and 15 ml. of pyridine were refluxed for 2½ hours. On cooling, 300 ml. of diethyl ether was added to the reaction mixture. A viscous residue was obtained which was washed several times with ether. The residue was then dissolved in 10 ml. of acetone, chilled and the dye crystals collected on a filter, washed several times with water, then acetone and air dried. The yield of crude dye was 0.3 g., 21% of theoretical. After two recrystallizations from methyl alcohol (50 ml. per gram) minute blue crystals with a greenish reflex were obtained in 10% yield, melting at 235° d. A solution of the dye in methyl alcohol is red with an absorption maximum at 526 mu.

*Example 6.—3,3'-dimethyl-4'-aminooxathiazolo-carbocyanine iodide*

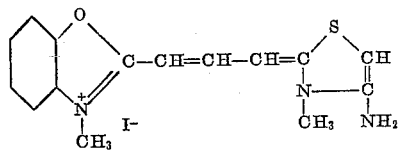

0.8 g. (1 mol) of 2-β-acetanilidovinyl benzoxazole methiodide, 0.5 g. (1 mol) of 4-amino-2-methyl thiazole methiodide, 0.5 g. (2 mol) of triethylamine and 10 ml. of absolute ethyl alcohol were refluxed 15 minutes. On cooling, a bright red precipitate was obtained which was filtered off, washed with water, then acetone and air dried. In this manner, 0.8 g. (58%) of crude dye was obtained. The dye was recrystallized twice from methyl alcohol (100 ml. per gram). Yield: 0.1 g. (8%). The pure dye was obtained in the form of a bright red powder which melted at 240°–242° with decomposition. A solution of the dye in methyl alcohol is reddish orange with a maximum at 500 mu.

*Example 7.—3,3'-diethyl-4'-aminooxathiazolo-carbocyanine iodide*

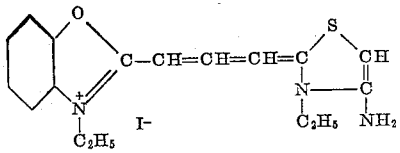

0.8 g. (1 mol) of 4-methyl-2-amino thiazole ethiodide, 1.3 g. (1 mol) of 2-β-acetanilidovinylbenzoxazole ethiodide, 0.8 g. (2 mol) of trimethyl amine and 15 ml. of absolute ethyl alcohol were refluxed for 20 minutes. On cooling, the dye crystals were filtered off, washed well with water, then acetone and air dried. The yield of crude dye was 0.9 g. (70%). It was recrystallized twice from methyl alcohol (100 ml. per gram) to yield 0.5 g. (46%) of pure dye in the form of minute reddish purple crystals which melted at 246°–247° with decomposition.

A solution of the dye in methyl alcohol was reddish orange with an absorption maximum at 504 mu.

*Example 8.—1'-ethyl-3-methyl-4-aminothiazolo-2'-cyanine iodide*

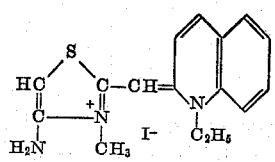

1.5 g. (1 mol) of 2-iodoquinoline ethiodide, 1.0 g. (1 mol) of 4-amino-2-methyl thiazole methiodide, 1.0 g. (2 mol) of triethylamine and 10 ml. of absolute ethyl alcohol were refluxed 5 minutes. On cooling to 0°, reddish orange needles were obtained. These were collected on a filter, washed well with water, then acetone and dried in vacuo. In this manner, 0.4 g. (26%) of crude dye was obtained. The dye was recrystallized twice from methyl alcohol (200 ml. per gram) and a 6.5% yield of pure dye was obtained in the form of reddish orange needles which melted at 270–271 d. A methyl alcohol solution of the dye had absorption maxima at 454 mu. and 466 mu. each of equal intensity.

*Example 9.—3-ethyl-5[(3-methyl-4-amino (2,3) thiazolylidene)ethylidene]rhodanine*

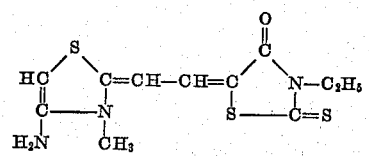

1.0 g. (1 mol) of 4-amino-2-methyl thiazole methiodide, 1.1 g. (1 mol) of 5-acetanilidomethylene-3-ethyl-rhodanine, 1 g. (1 mol) of triethylamine and 15 ml. of absolute ethyl alcohol were refluxed for 5 minutes. On cooling, the precipitated dye was collected on a filter, washed successively with water and acetone and dried in vacuo. The yield of crude dye was 0.7 g. (60%). The dye was purified by recrystallization from methyl alcohol (100 ml. per gram). It was obtained in the form of bright red velvet-like needles in 12% yield melting at 270° d. A solution of the dye in methyl alcohol was reddish orange with an absorption maximum at 510 mu.

*Example 10.—2-p-dimethyl aminostyryl-4-aminothiazole methiodide*

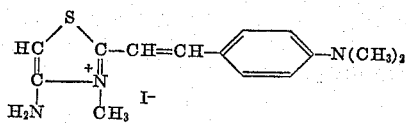

0.56 g. (1 mol) of p-dimethylaminobenzaldehyde, 1.0 g. (1 mol) of 4-amino-2-methyl thiazole methiodide and 20 ml. of acetic anhydride were refluxed 10 minutes. After chilling overnight, the precipitate was collected on a filter, washed with water, then acetone and air dried. In this manner, 0.8 g. (55%) of crude dye was obtained which, after two recrystallizations from methyl alcohol, yielded pure dye in 30% yield, M.P. 262° d. A solution of the dye in methyl alcohol was reddish orange with an absorption maximum at 520 mu.

*Example 11.—1,3,3,3'-tetramethyl-4'-aminopseudoindolothiazolocarbocyanine iodide*

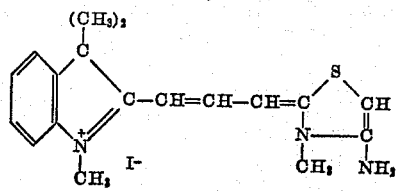

1 g. (1 mol) of 1,3,3-trimethyl-formyl methylene indolenine, 1 g. (1 mol) of 4-amino-2-methyl thiazole methiodide and 15 ml. of acetic anhydride were refluxed 20 minutes. After cooling overnight, the dye crystals were collected on a filter, washed well with water, then acetone and dried in vacuo. The yield of crude dye was 72%. After two recrystallizations from methyl alcohol, a 33% yield of pure due was obtained in the form of green plates with a metallic reflex and melting at 244° d. A solution of the dye in methyl alcohol was bright red with an absorption maximum at 528 mu.

In the foregoing, we have explained our invention in such manner that it may be understood by those skilled in the art. The features of novelty which we believe to be characteristic of it are set forth with particularity in the following claims. It is to be understood, however, that modifications and changes may be made without departing from the spirit and substance of our invention as will be clear to those skilled in the art.

I claim:

1. A dye selected from the group characterized by the following general formula:

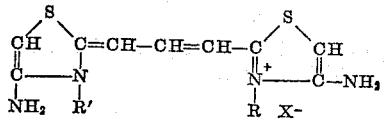

in which R and R' respectively represent a member selected from the group consisting of alkyl and aralkyl groups and X⁻ represents an acid radical.

2. 3,3'-dimethyl - 4,4' - diaminothiazolo carbocyanine iodide.

3. 3,3'-diethyl 4,4'-diaminothiazolocarbocyanine iodide.

4. A dye selected from the group characterized by the following general formula:

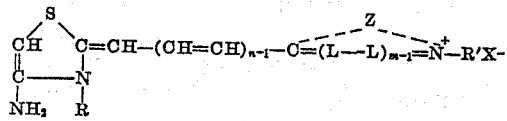

in which R and R' respectively represent a member selected from the group consisting of alkyl and aralkyl groups, L represents a methine group, m represents a positive integer from 1 to 2, n represents a positive integer from 1 to 3, X represents an acid radical and Z represents the nonmetallic atoms necessary to complete a heterocyclic nucleus containing from 5 to 6 atoms in the heterocyclic ring, said nucleus being selected from the group consisting of a nucleus of the oxazole series, a nucleus of the thiazole series, a nucleus of the thiazoline series, a nucleus of the benzoxazole series, a nucleus of the benzothiazole series, a nucleus of the alpha naphthoxazole series, a nucleus of the beta naphthoxazole series, a nucleus of the alpha naphthothiazole series, a nucleus of the beta naphthothiazole series, a nucleus of the selenazole series, a nucleus of the pyridine series, and a nucleus of the 3,3-dialkyl indolenine series.

5. 3,3'-dimethyl-4'-amino oxathiazolocarbocyanine iodide having the following structure:

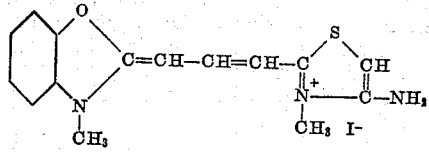

6. 1'-ethyl-3-methyl-4'-amino thiazolo-2'-cyanine iodide having the structure

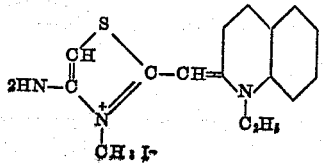

7. A dye selected from the group characterized by the following general formula:

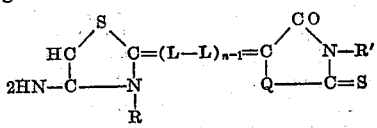

where R represents a member selected from the group consisting of alkyl and aralkyl groups, R' represents a member selected from the group consisting of alkyl, aralkyl, and aryl groups, L is a methine group, $n$ is a positive integer of from 1 to 4 both inclusive and Q is a member selected from the group consisting of oxygen, sulfur, selenium and =N—R'.

8. 3-ethyl-5-[(3-methyl-4-amino (2,3) thiazolylidene) ethylidene] rhodanine having the following structure:

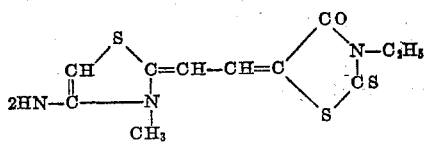

9. A dye selected from the group characterized by the following general formula:

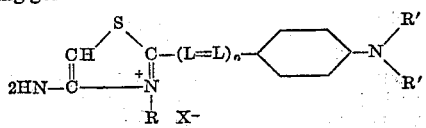

where R and R' respectively represent a member selected from the group consisting of alkyl and aralkyl groups, L represents a methine group, $n$ represents a positive integer from 1 to 2 and X⁻ represents an acid radical.

10. 2-p-dimethyl aminostyryl-4-aminothiazole methiodide having the structure:

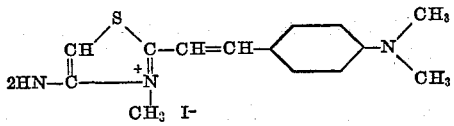

11. A process for preparing symmetrical carbocyanine dyes having the general formula:

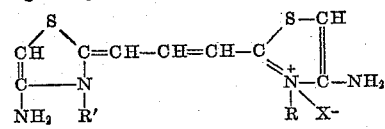

wherein R and R' respectively represent members selected from the group consisting of alkyl and aralkyl groups, and X⁻ represents an acid radical from a quaternary salt having the general formula:

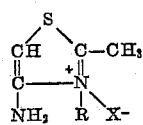

where R represents a members selected from the group consisting of alkyl and aralkyl groups and X⁻ represents an acid radical comprising condensing the quaternary salt with an ester of an orthocarboxylic acid in an alkaline medium containing at least one constituent selected from the group consisting of pyridine and a mixture of pyridine and triethylamine.

12. A process for preparing unsymmetrical cyanine dyes having the general formula:

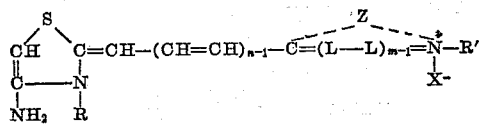

wherein R and R' represent members selected from the group consisting of alkyl and aralkyl groups, $m$ represents a positive integer from 1 to 2, L represents a methine group, $n$ represents a positive integer from 1 to 3, both inclusive, X⁻ represents an anion and Z represents the non-metallic atoms necessary to complete a heterocyclic nucleus containing from 5 to 6 atoms in the heterocyclic ring, said nucleus being selected from the group consisting of a nucleus of the oxazole series, a nucleus of the thiazole series, a nucleus of the thiazoline series, a nucleus of the benzoxazole series, a nucleus of the benzothiazole series, a nucleus of the alpha naphthoxazole series, a nucleus of the beta naphthoxazole series, a nucleus of the alpha naphthothiazole series, a nucleus of the beta naphthothiazole series, a nucleus of the selenazole series, a nucleus of the pyridine series, and a nucleus of the 3,3 dialkyl indolenine series from the quaternary salt having the general formula:

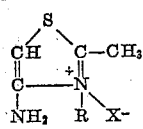

where R represents a member selected from the group consisting of alkyl and aralkyl groups and X⁻ represents an acid radical comprising condensing the quaternary salts with a heterocyclic ammonium quaternary salt having a reactive constituent selected from the group consisting of an aryl aminovinyl group, an aryl aminobutadienyl group, an alkyl mercapto vinyl group, a halogen atom and a thioether group in a position selected from the group consisting of alpha and gamma positions with respect to the nitrogen atom in said heterocyclic ring of said heterocyclic ammonium quaternary salt in the presence of an alkaline condensing agent.

13. A process for preparing merocarbocyanine dyes containing the 2-methyl-4-amino thiazole nucleus and having the formula:

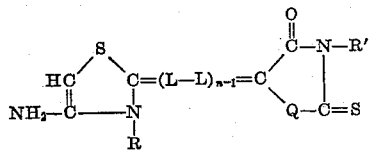

wherein R represents a member selected from the group consisting of alkyl and aralkyl groups, R' represents a member selected from the group consisting of alkyl, aryl and aralkyl groups, L is a methine group, $n$ is a positive integer from 1 to 4, both inclusive, and Q is a member selected from the group consisting of oxygen, sulfur, selenium, or =N—R' comprising condensing a quaternary salt having the general formula:

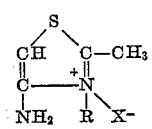

where R represents a member selected from the group consisting of alkyl and aralkyl groups and X⁻ represents an acid radical with a ketomethylene heterocyclic compound having the ketomethylene heterocyclic ring of said merocarbocyanine dyes and having a reactive arylaminomethylene group in the 5 position with respect to the member represented by Q in the general formula for said merocarbocyanine dye in an alkaline medium.

14. A process for preparing styryl dyes containing the 4-amino-2-methyl thiazole nucleus and having the formula:

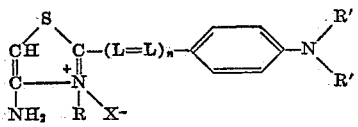

where R and R' represent a member selected from the group consisting of alkyl and aralkyl groups, L represents a methine group, $n$ is a positive integer from 1 to 2 and $X^-$ represents an acid radical comprising condensing a quaternary salt having the general formula:

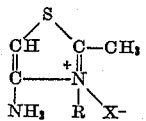

wherein R represents a member selected from the group consisting of alkyl and aralkyl groups and $X^-$ represents an acid radical with p-dialkyl aminobenzaldehyde in the presence of an alkaline catalyst.

References Cited in the file of this patent

UNITED STATES PATENTS

| | | |
|---|---|---|
| 2,131,865 | Zeh | Oct. 4, 1938 |
| 2,166,736 | White et al. | July 18, 1939 |
| 2,263,749 | White et al. | Nov. 25, 1941 |
| 2,320,654 | Riester | June 1, 1943 |
| 2,322,015 | Hamer et al. | June 15, 1943 |
| 2,330,203 | Brooker et al. | Sept. 28, 1943 |
| 2,338,782 | Riester | Jan. 11, 1944 |
| 2,340,882 | Kendall | Feb. 8, 1944 |
| 2,353,164 | Kendall | July 11, 1944 |
| 2,495,260 | Jennen et al. | Jan. 24, 1950 |

OTHER REFERENCES

Chemical Abstracts 16:3101. (Copy in S.L.) (Abstract of Brit. Med. Journal, 1922, I, 514–515.)

Chemical Abstracts 19:530. (Copy in S.L.) (Abstract of Proc. Roy. Soc., London, 96 B, 317–333, 1924.)

Clerc, "Photography Theory and Practice" 3rd Ed., page 151. Pitman Pub. Corp., N.Y., 1942. (Copy in Div. 60.)

Chemical Abstracts 40, 4059(i) (1946), (copy in S.L.).

Chemical Abstracts 41, 119(g) (1947), (copy in S.L.).

Taylor et al.: J. Am. Chem. Soc. 77, 5444 (1955), (copy in S.L.).